Nov. 24, 1925.
M. J. BROWN
1,562,684
SYNTHESIZING GASES IN ELECTRIC FURNACES
Filed Oct. 2, 1922
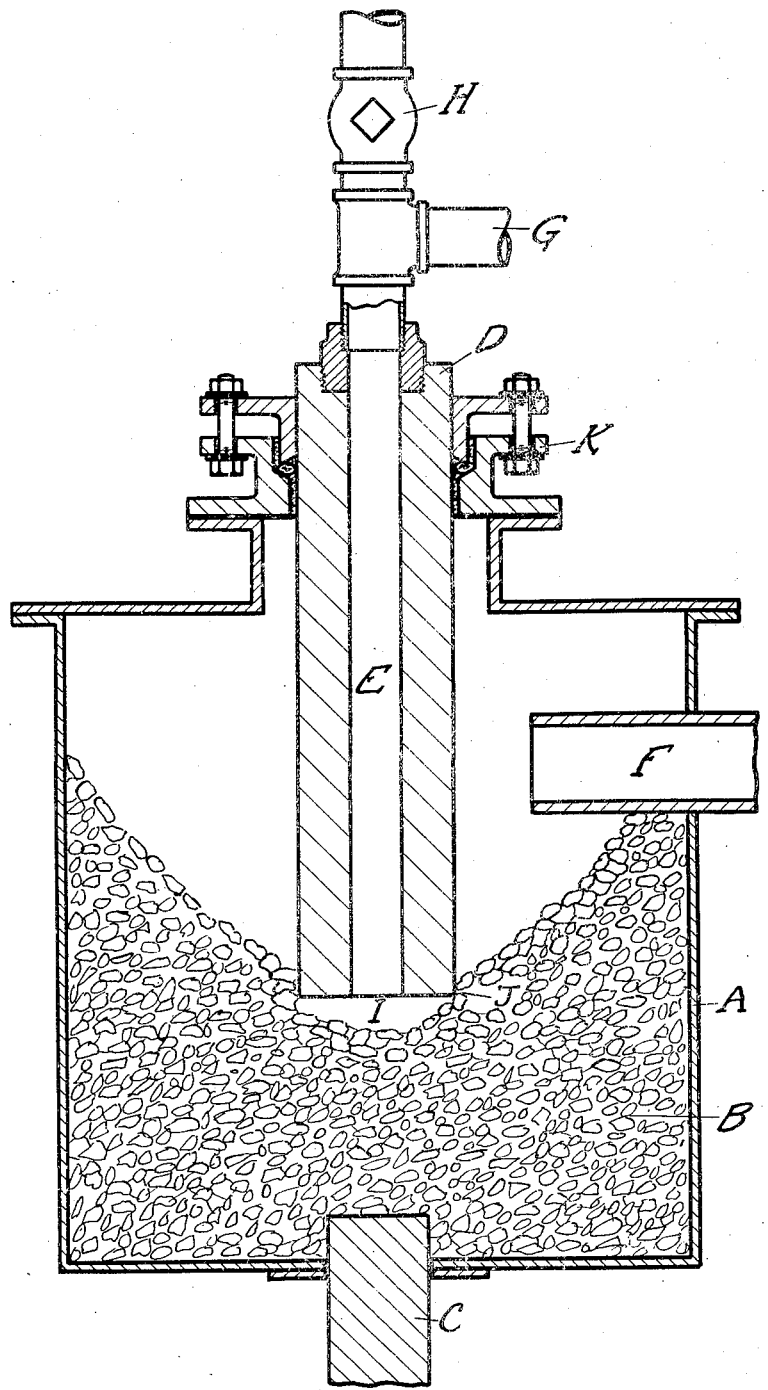
INVENTOR
Mortimer Jay Brown
BY J. S. Wooster
ATTORNEY Patented Nov. 24, 1925.

1,562,684

UNITED STATES PATENT OFFICE.

MORTIMER JAY BROWN, OF NIAGARA FALLS, NEW YORK, ASSIGNOR TO THE ROESSLER & HASSLACHER CHEMICAL COMPANY, OF NEW YORK, N. Y., A CORPORATION OF NEW YORK.

SYNTHESIZING GASES IN ELECTRIC FURNACES.

Application filed October 2, 1922. Serial No. 591,695.

*To all whom it may concern:*

Be it known that I, MORTIMER JAY BROWN, a citizen of the United States, and resident of Niagara Falls, in the county of Niagara and State of New York, have invented certain new and useful Synthesizing Gases in Electric Furnaces, of which the following is a specification.

This invention relates to process for synthesizing gases and has particular reference to electric resistance processes wherein gases are synthesized by being passed through a heated zone in a resistor composed of comminuted solid material which will be volatilized or corroded, and may or may not combine in forming the reaction gas. Since voids produced by such action in such a resistor tend to increase the electric resistance, and to decrease the normal flow of electric current and thereby to reduce the yield, the object of this invention is to supply resistor material with the incoming gas, and preferably through a hollow electrode, in such manner that the gas current, in seeking the easiest path through such voids in the resistor, carries filling material therewith to plug same, thus keeping the electrical resistance of the resistor within predetermined limits. This provides adequate and continuous control over power input, and therefore capacity of output.

As examples to which my invention is applicable may be mentioned electric furnace processes wherein the resistor is removed by chemical corrosion of circulating gases and must be renewed in such a manner as to maintain efficient contact of gas with solid.

As a specific illustration of my invention I will now describe its application to the synthesis of hydrogen cyanide from solid carbon and gases containing hydrogen and nitrogen.

It has long been known that at high temperatures, for example, around 3000° C. there is an endothermic reaction between hydrogen, nitrogen and carbon to form hydrogen cyanide, and that theoretically the resulting concentrations of hydrogen cyanide are sufficiently high to be valuable for the production of cyanides, and also for the fixation of nitrogen. Processes based upon this reaction have been repeatedly proposed for commercial application, but until the discovery described below no significant amount of hydrogen cyanide has been made by any of them.

The problem of making hydrogen cyanide by synthesis from its elements is a deceptive one, because most forms of electric furnaces seem to be applicable thereto. The most simple form of equipment is some form of an electric arc, and it has been proposed to pass hydrogen and nitrogen into electric arcs, the most common device being that of passing the gases through one or both of the electrodes that are made hollow for that purpose. Hydrogen cyanide can be made with such equipment, but the cost for carbons, labor and power is prohibitive.

Another proposal is to use a high voltage arc wherein only gaseous raw materials are used. I do not know of any such equipment that is now operated as a producing process.

A third proposal is a simple electric resistance furnace with granular carbon as a resistor. Hydrogen cyanide can be made in such a furnace, but unless the furnace is operated in accordance with my invention described below both power and labor costs will be excessive and hydrogen cyanide concentrations will in all cases be low.

The reason for previous failure is that constant corrosion of the resistor develops at first small channels and then enlarges these small channels to big ones. The enlargement of these fissures, increases the electrical resistance, causes an uneven distribution of heat evolved in the reaction zone and gas flow, and prevents efficient contact between the resistor and moving gases. Therefore, simultaneously with the enlargement of the small fissures, the concentration of hydrogen cyanide in the escaping gases continually falls. It therefore is apparent that if such a furnace is to be operated with a consistently high hydrogen cyanide concentration the resistor bed must be continuously maintained in the proper mechanical condition.

The success of my process depends upon my discovery of means for accomplishing this continuous correction of incorrect mechanical conditions in the resistor bed. This discovery I shall now proceed to explain by referring to the accompanying drawing, which shows only one of several forms of apparatus that may be used successfully for my invention. A is a shell preferably of iron; B is a filling of granular carbon which may be in the form of graphite; C is the positive electrode of graphite for use with direct current; D is the negative electrode of graphite and E is a central opening along the axis of that electrode; F is a graphite tube which serves to remove gases from the furnace; G is an opening through which gases may be introduced into the electrode D; H is a mechanical device for introducing solid carbon into the electrode D without losing significant amounts of gases that may be under pressure therein; I is a cavity below the end of electrode D; J is an annular opening of indefinite dimensions extending from the cavity I upward around the lower end of electrode D; K is a gas tight gland that serves to permit of vertical adjustment of electrode D and likewise to provide electrical insulation between D and the rest of the furnace.

This furnace may be built with electrodes that are, for example, 9" in diameter with the vertical hole through the negative electrode from 2½" to 3" in diameter. If graphite entirely is used in the furnace a convenient voltage is 65 volts, and convenient amperage 6500 amperes. The electrode may be immersed about ten inches in the resistor bed. A mixture of gaseous hydrogen and nitrogen may be passed into and out of the furnace at the rate of approximately 100 cu. ft. per minute. Since my invention does not pertain to the recovery of hydrogen cyanide from the reaction gases I do not indicate any apparatus for that purpose. If such a furnace is operated without adjustment of the electrode D and without introduction of carbon, it will only operate for from one-half up to one hour or more, when the current will gradually fall off to zero due to increase of the electrical resistance as the resistor carbon is removed.

When operating my furnace I add carbon; for example, pieces of graphite, at a rate substantially equal to the rate at which it is removed. If the conversion of carbon to hydrogen cyanide proceeds at the rate: for example, of 100 grams per minute, carbon must be introduced at that rate and in addition some carbon must be added to replace what is continually removed from the furnace as dust. The desired electrical resistance of the resistor is thus maintained. This carbon if in the form of graphite is introduced in pieces from ¼" to ¾" in diameter, at intervals of approximately one second. These intervals can be made shorter if it is desired, in which case the introduction of carbon can be made to approximate almost a continuous stream. If gases are introduced at a rate of 100 cu. ft. per minute the velocity at the lower end of the electrode is such that properly sized pieces of carbon are lifted bodily from the cavity and carried to positions alongside of the electrode at J, and under some circumstances, through the opening J so violently that they may hit the top of the furnace. It is essential to the successful operation of my process that there be sufficient velocity in the cavity I to forcibly remove the particles of graphite that are introduced. It is also necessary that the depth of immersion of the electrode D in the graphite bed should be sufficient so that with the gas volume used particles of graphite will not be carried entirely beyond the annular opening J. When the volume is correct, and the size of the particles is correct, I find no difficulty in effectively closing the annular opening J so that there are no large fissures to carry unusually large streams of gas. It will be easily understood from the foregoing that if a large fissure does develop in J, it is only necessary to drop in large pieces of graphite; for example, ¾" in diameter, which pieces will be carried by the rapidly moving gases into the opening where the piece or pieces will jam and effectively prevent the too rapid escape of the gases at that point. I have found that it is possible to use as a guide for furnace operation the differential pressure between the inside of electrode D and the inside of the furnace. For example, I have found that by judicious feeding of graphite, and thus increasing the differential pressure, from 200 m. m. of water to 600 m. m. of water, it is very easy to increase the hydrogen cyanide percentage from three per cent up to six per cent or more. I have found that there is a considerable range of gas volumes that may be successfully used and likewise a considerable range of sizes of solid particles of carbon. There is a sufficient range to permit of automatic mechanical feeding, thus reducing what might otherwise be a large labor charge. These above rates of flow, the size of graphite, and also the hydrogen cyanide concentrations are not limiting figures but are merely given to show what can actually be attained in any simple demonstration.

My invention pertains particularly to means for continuously maintaining a resistor bed in the desired condition. In utilizing my invention for the production of hydrogen cyanide I can use other sources of hydrogen than the elementary gas; for example, hydrocarbons such as gasolene, and in part at least, other sources of carbon than the resistor bed. Any carbon dust issuing from the furnace can be effectively separated by well-known mechanical means, briquetted and returned to the system.

Although I have indicated the use of graphite for the resistor bed in the foregoing illustration, carbon in various forms, including coal, coke and charcoal can be used. I therefore wish it to be understood that by a carbon resistor I mean any and all forms of solid carbon from whatever source derived, and by hydrogen I mean not only the elementary gas but also all hydrocarbons and hydronitrogens that may furnish hydrogen at high temperatures. All such gases as acetylene and ammonia come within the scope of my invention.

Although I have indicated the use of direct current, alternating current can be used, although with the latter there is a larger loss of electrode than with the former.

While the foregoing statements relate more particularly to the manufacture of hydrocyanic acid, my invention is manifestly capable of being utilized in any reaction taking place in an electric furnace at high temperatures where the resistor takes part in the reaction, or in any reaction between solids and gases where intimate contact between solid and gas is essential.

I claim:

1. In a resistance electric furnace for effecting gas reactions, of the type having a resistor of comminuted material interposed between the electrodes, the method which consists in supplying resistor material at such rate with the reacting gas as to maintain the electrical resistance within predetermined limits.

2. In the synthesis of gas in an electric arc, maintaining between electrodes a reaction zone of high temperature in a resistor composed of comminuted material capable of being volatilized by the arc, passing reacting gas to the reaction zone and out through the resistor interstices, and maintaining the electrical resistance of the resistor within predetermined limits by blowing with the reacting gas additional comminuted resistance material into voids formed in the resistor.

3. In the synthesis of gas in an electric arc, maintaining between electrodes a reaction zone of high temperature in a resistor composed of comminuted material capable of being volatilized by the arc, conducting reacting gas through one electrode to the reaction zone and thence through the interstices of the resistor, and supplying comminuted resistor material through the electrode with the reacting gas at such rate as to maintain the electrical resistance of the furnace between predetermined limits.

4. In the synthesis of gas in an electric arc, maintaining between electrodes a reaction zone of high temperature in a resistor composed of comminuted reactive material, conducting reacting gas through one electrode to the reaction zone and thence through the interstices of the resistor, and supplying comminuted resistor material through the electrode with the reacting gas at such rate as to maintain the electrical resistance of the furnace between predetermined limits.

5. In the synthesis of gas in an electric arc, maintaining between an upper tubular electrode and a bottom electrode a reaction zone of high temperature in a resistor composed of comminuted material subject to corrosion by the reacting gas, passing reacting gas through the upper electrode to the reaction zone and thence through the interstices of the resistor, and supplying comminuted resistor material of such size and at such rate through the electrode with the reacting gas as to maintain the electrical resistance of the resistor within predetermined limits.

6. In an electric furnace wherein a resistor of comminuted material is subject to corrosion by moving gas, that improvement which consists in introducing with the gas current, pieces of said material which will be carried into and fill voids in the resistor to maintain the electrical resistance within predetermined limits.

7. In an electric furnace wherein a granular carbon resistor is subject to corrosion by moving gas, that improvement which consists in introducing with the gas current pieces of carbon of such density and size that they will be carried into voids in the resistor bed by the inflowing gas to maintain the electrical resistance within predetermined limits.

8. In an electric furnace for making hydrogen cyanide wherein a granular carbon resistor is subject to corrosion by moving gas, that improvement which consists in introducing with the gas current pieces of carbon of such density and size that they will be carried into voids in the resistor bed by the inflowing gas to maintain the electrical resistance within predetermined limits.

9. In an electric furnace for making hydrogen cyanide from the elements wherein a granular carbon resistor is subject to corrosion by moving gas, that improvement which consists in introducing with the gas current pieces of carbon of such density and size that they will be carried into voids in the resistor bed by the inflowing gas to maintain the electrical resistance within predetermined limits.

10. An electric furnace including two electrodes, one of said electrodes comprising a body of comminuted carbon and the other electrode comprising a tube extending downwardly into the body of comminuted carbon, means for supplying additional comminuted carbon through the tube, means for passing gas through the tube to the space between said electrodes to carry the additional carbon into the voids of the comminuted electrode, and means for collecting reaction gas exterior of the tubular electrode.

11. An electric furnace for effecting gas reactions including two electrodes, one of said electrodes comprising a body of comminuted carbon, and the other electrode comprising a tube projecting vertically downward into the body of comminuted carbon, means for passing through the tube reacting gases at such velocity and pieces of carbon of such size and density that the pieces of carbon are carried by the gases into the voids of the body of comminuted carbon, and means for conducting gas from the furnace.

Signed at Niagara Falls in the county of Niagara and State of New York this 25th day of September, A. D. 1922.

MORTIMER JAY BROWN.